Figure 5:
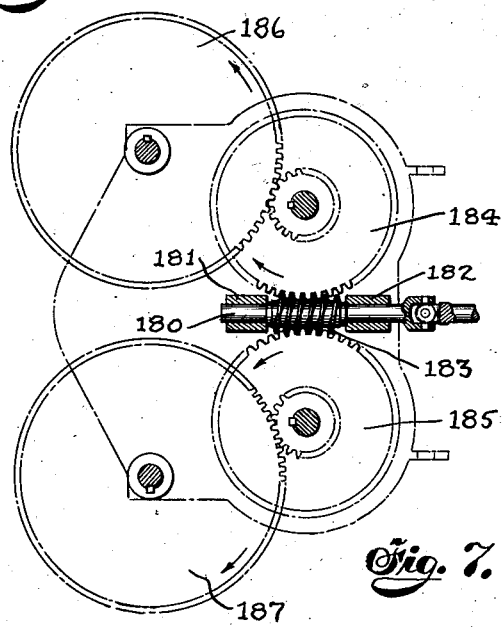

Jan. 14, 1930.  N. C. STOREY  1,743,836
TILLING MACHINE
Filed Feb. 15, 1922   4 Sheets-Sheet 1
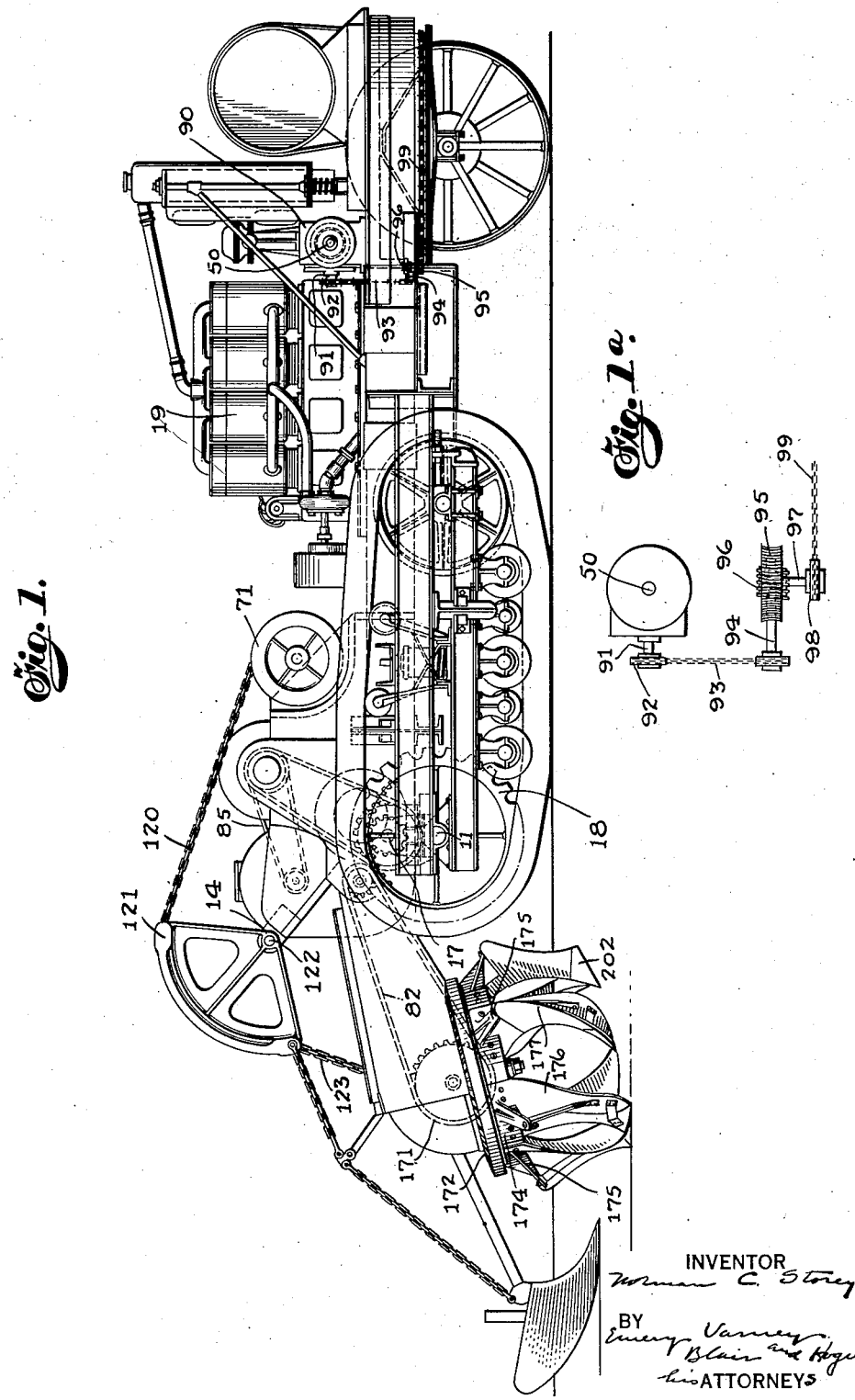

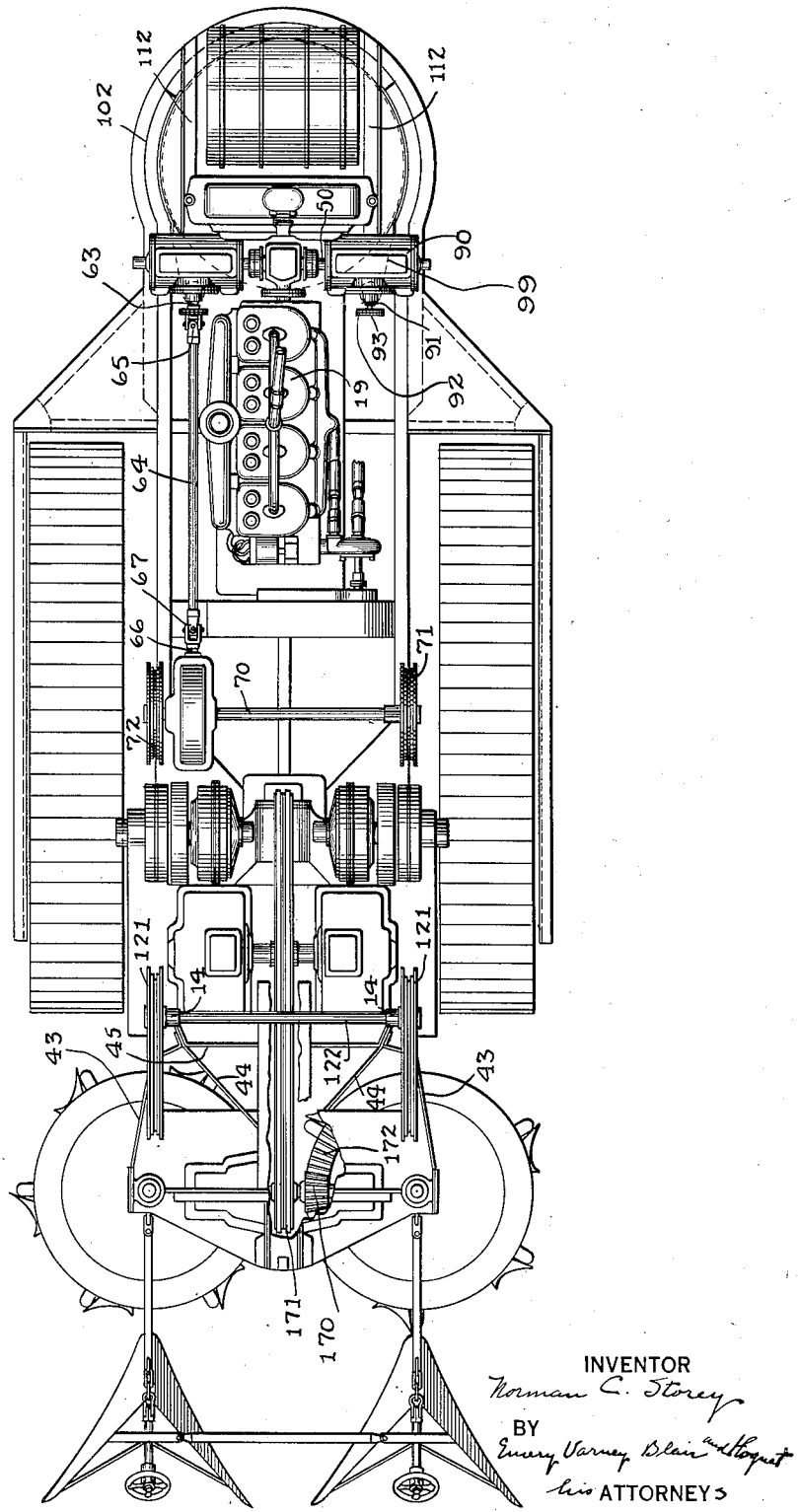

Jan. 14, 1930.  N. C. STOREY  1,743,836
TILLING MACHINE
Filed Feb. 15, 1922   4 Sheets-Sheet 3
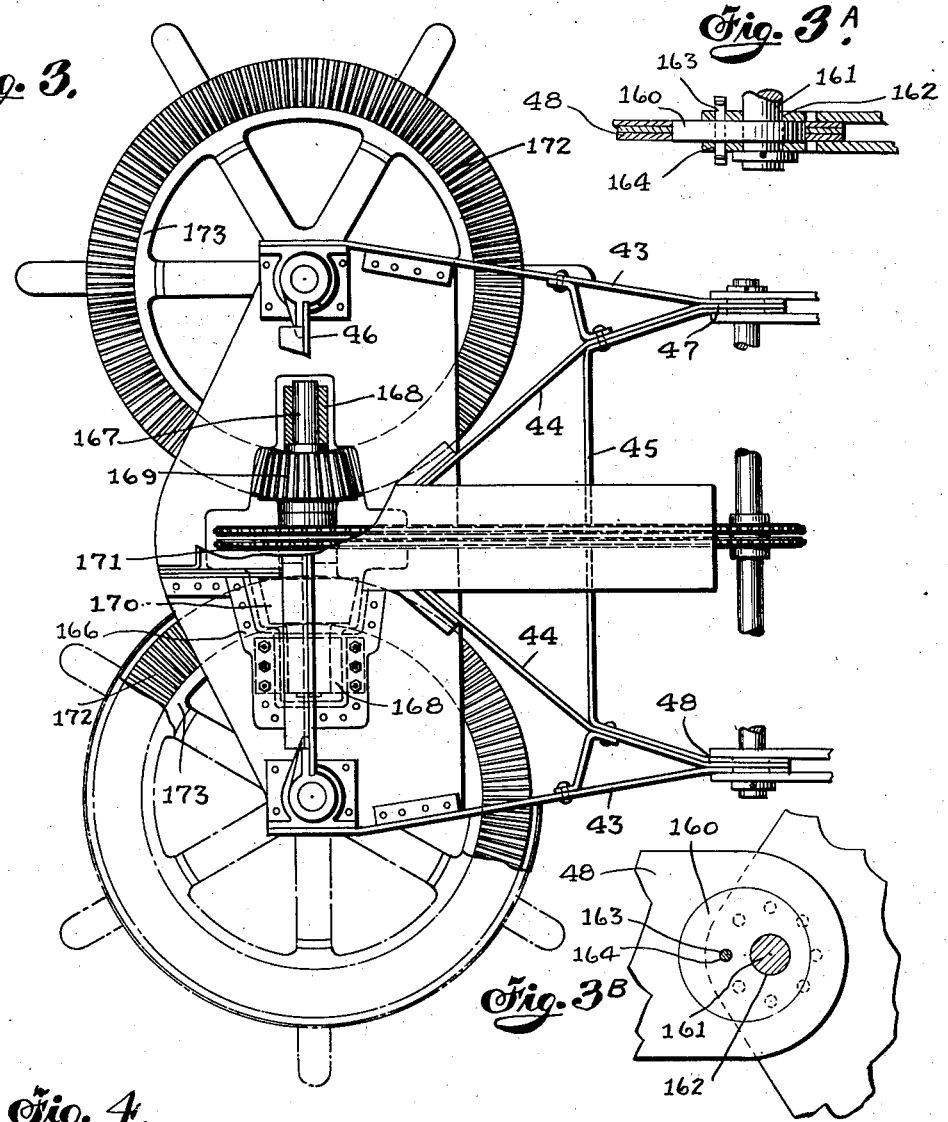

Jan. 14, 1930.  N. C. STOREY  1,743,836
TILLING MACHINE
Filed Feb. 15, 1922  4 Sheets-Sheet 4

INVENTOR
Norman C. Storey
BY
Emery, Varney, Whann and Hogue
his ATTORNEYS

Patented Jan. 14, 1930

1,743,836

UNITED STATES PATENT OFFICE

NORMAN C. STOREY, OF PASSAIC, NEW JERSEY

TILLING MACHINE

Application filed February 15, 1922. Serial No. 536,636.

The present invention relates to an improvement in tilling machines more particularly of the heavy service motor driven type for preparing the soil for planting. One object of the invention has been to provide a machine of the type referred to which will thoroughly plow and pulverize the soil over a substantial width of ground so that it is prepared by a single operation to receive seeds or plants. In some kinds of soil, the ordinary operation of plowing and harrowing leaves much to be desired in the way of thorough breaking up of the upturned lumps or clods. For such crops as sugar cane and tobacco, it is desirable to have a relatively deep layer or bed of thoroughly broken up soil in which to set the plants. At the same time, it is necessary to accomplish this thorough pulverizing of the earth in a manner which is sufficiently rapid and economical to meet practical requirements. In my previous Patent No. 1,208,856 dated December 19, 1916, I have illustrated and described a motor driven tilling machine intended to accomplish substantially the results which I have outlined hereinabove. The construction forming the subject matter of the present application is an improvement upon the device illustrated in said Letters Patent and includes details of construction which render the machine more practicable in actual operation and by means of which the parts are strengthened to resist wear and tear and to withstand hard usage in almost any kind of soil in which ordinary plowing can be practiced. An object of the improvements referred to has been to provide driving, transmission and control mechanism whereby the operator may secure a very wide range of speed to meet varying conditions. A further object has been to provide for controlling the speed of the implement rotor mechanism in such a way as to control the increment of cut taken by the plows or implements both in their forward movement and in their circular movement. In other words, it is desirable to provide a device in which the increment of cut of the rotating plows is not necessarily dependent upon the speed with which the machine is advancing, but is rather a controllable resultant of both their turning and advancing speeds.

A further object is to provide means whereby when my tractor has completed its course across the field in one direction, and is turned to reverse its course, only the front wheels shall be driven; a further object is to provide means whereby forward movement of the tractor may be halted at any time by the operator without halting the movement of implement frame and implements thereon. Such an arrangement will permit the operator to halt his machine where he deems it necessary to work the implements into the soil to a further extent than he has found generally necessary in the course of his work, as for example, when he is passing over a stretch of ground where the soil is so compact that it cannot be pulverized to the proper extent if the tilling machine is in motion.

One of the difficulties encountered in the use of a tilling machine having rotating plows is that the device may be subject to injury upon encountering rocks and other obstacles in the soil being cultivated. To minimize the damage and delay due to causes of this sort, I have embodied in the improved device a form of implement carrier construction by means of which the stresses and strains coming directly upon the implement rotor mechanism are not injuriously transmitted to the remainder of the machine. Furthermore, the plows or implements are so constructed and so secured to the rotating parts of the device that they may safely encounter rocks and stones of considerable size without injury, and, if injured they may be readily removed and replaced as relatively small units without dismantling any substantial part of the whole machine.

An embodiment of my invention is illustrated in the drawings accompanying the present specification, and in which Figure 1 a side elevation showing the rotor and plows in operative position.

Figure 1A, a view in detail of connection to steering or pilot wheel,

Figure 2, a top plan view.

Figure 6:
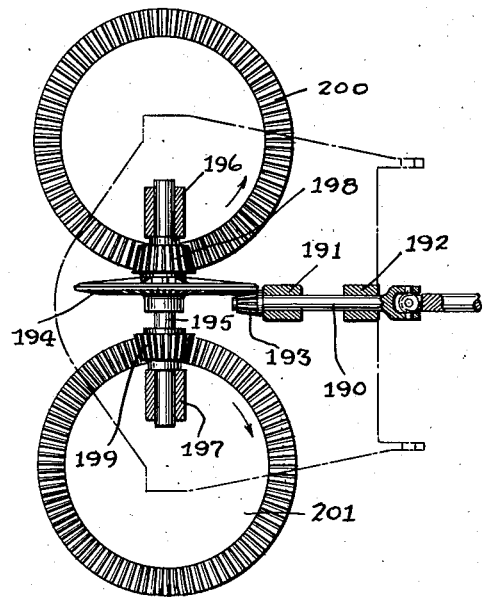
Figure 7:
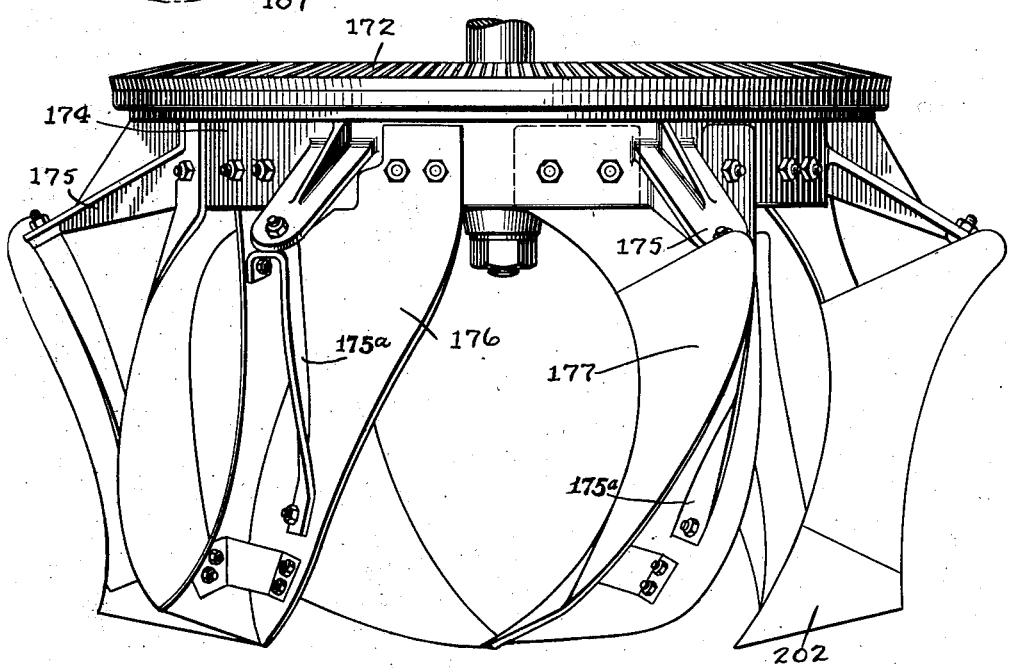

Figure 3, a top plan view of the implement carrier and rotors with portions broken away, Figure 3A, a detail of the rotor driving chain take-up mechanism,
Figure 3B, a detail in section of the same,
Figure 4, a side elevation of the same,
Figure 5, a modified form of drive for the rotors,
Figure 6, another modified form of drive for the rotors,
Figure 7, a detail illustrating the form of the plows and their method of attachment to the rotor.

The embodiment of my invention illustrated in the drawings comprises a motor driven tractor and a rotor carrying implement frame with means for transmitting power from the motor to the propelling mechanism of the tractor and to the propelling mechanism of the rotors and mechanism for raising the implement frame out of and lowering the same into operative soil tilling position. Inasmuch as the implement frame is adapted to be attached to any ordinary tractor, the tractor itself will not be described nor referred to except in so far as is necessary for a full understanding of the mode of connection of the rotary implement frame thereto and its mode of cooperation therewith.

Referring to Figure 2, the power equipment for my improved tilling machine may consists of a gas engine 19 of the marine type and having connections at both ends of the shaft for transmitting power. Thus, at the front end, through suitable transmission mechanism, power is supplied to actuate the steering mechanism and the implement frame hoisting mechanism. From the rear of the engine, I transmit power for propelling the tractor and for actuating the plow or implement carrying rotors.

The forward transmission includes a transverse shaft 50 driven by any suitable connection with the shaft of the motor 19. From the forward transmission, I drive both the implement frame hoisting mechanism and the steering mechanism by similar transmission and clutch devices. The bevel gears 56 and 57 mounted on shaft 50 constitute the driving gears while a gear 62 mounted on shaft 63 is the driven gear and actuates the shaft 63 which, as shown in Figure 3, includes a coupling section 64 connected at one end with shaft 63 by a universal joint 65 and at the other with a shaft 66 by a universal joint 67, said shaft 66 being provided with a worm 68, meshing with a gear 69 secured to a shaft 70, said shaft having chain winding members 71 and 72 with peripheral chain receiving grooves upon which the implement frame hoisting chains 120, Figure 1, are wound to effect raising of said frame.

The driving gears may be caused to cooperate with suitable clutch mechanism (not shown) by the throwing of a lever by the driver. The gears may be driven in either direction, accordingly as the lever is thrown to the left or to the right.

As shown in Figure 1, the hoisting chain 120 having one end engaging the hoisting member 71 is secured at the other end to a segment 121 mounted on a shaft 122 journaled in the bearing 14. The rear end of the chain passes across the peripheral portion of the segment 121 and lies in a peripheral groove with the end of the chain secured at the rear end of the groove. A connecting chain 123 has one end secured to the rear peripheral end of the segment 121 and the other end secured to the implement frame so that, when the segment 121 is rocked forward by rotation of the winding member 71, the implement frame is thereby raised out of engagement with the ground where it remains positively locked in position by engagement of the worm thread 68 with the teeth of the gear 69.

The steering control mechanism which, as hereinabove stated is a replica of the implement frame hoisting control mechanism, is located in a housing 90, Figure 1, and operates a shaft 91, Figure 1A, to which is secured a sprocket 92. A chain 93 passing over said sprocket operates shaft 94 having a worm 95 meshing with a gear 96 on shaft 97 which carries a sprocket 98 operating a chain 99 extending around a chain groove formed in the forward truck 102. It will be obvious that the turning movement of this truck may be accomplished by operating the clutch mechanism within the housing 90 in such a manner as to rotate the steering wheel frame one way or the other as desired.

I prefer to so construct the mechanism of my improved device that the propelling mechanism will operate independently of the implement actuating mechanism. This has the advantage that the power to the propelling mechanism may be shut off, thus halting the forward progress of the machine while the implement carrier is still rotating; thus the operator is enabled, when he encounters a stretch of ground where the soil is especially closely packed, to remain on the spot as long as is necessary to pulverize the soil to the necessary extent and work into it to the necessary extent; it also permits him to halt the forward movement of the machine while he lifts the implement carriers over a rock or other obstruction.

As hereinabove indicated, the engine 19 drives from both ends, and accordingly cooperates with forwardly and rearwardly disposed transmission mechanisms, the latter being positioned and adapted to control the tractor drive and the implement rotor drive.

Referring now to Figures 3 and 4, the implement frame is an irregularly shaped frame consisting of a base plate 49, diagonal braces 44, side plates 43, and transverse braces 45 and 46 extending between the diagonal braces 44 and the side plates 43 respectively, secured to said base plate and the ends of said plates 43, braces 44 and 45 being brought together to form hubs 47 and 48, each having a hold adapted to receive a pin or other suitable device for pivotally attaching the implement frame to the tractor.

As shown in Figure 3A, a bushing 160 is inserted in the hub 48 and receives the pin 161 through an eccentric opening 162 which also passes through a hole not shown in the frame. A smaller perforation 163 is also provided in the member 160 to receive a locking pin 164 cooperating with the smaller perforations 165 in the tractor frame. Thus, by rotating the bushing 160 with respect to the hub 48 and fixing this position by means of the pin 164, the pivotal center of the implement frame may be adjusted to take up any slack in the rotor driving chain or for any other purpose.

The rotor frame carries a housing 166 in which is journaled a rotor driving shaft 167 supported in bearings 168. A pair of bevel gears 169 and 170 are secured to said shaft and between them is mounted a sprocket 171 for driving the shaft. The bevel gears 169 and 170 mesh with gear teeth 172 on the rotors 173 and operate to drive said rotors. As shown more clearly in Figure 7, each rotor includes a depending flange 174 and projecting arms 175 to which are secured a plurality of plows having their standards 176 attached to the depending flange and their mold boards 177 attached to the projecting arms. Braces 175ª extend down onto the sides of the standards 176. The purpose of these braces is to take up the side thrust and prevent the standards 176 from bending at the points where they are bolted to the flange 174. The standards are preferably positioned to straddle the flange and are secured at either side of each arm, one portion of the standard engaging an exteriorly exposed face of the flange, while another portion engages an interiorly exposed face of the flange. The bolts by means of which the plows are secured to the rotors are preferably of such strength that they constitute the weakest portion of the implement supporting and actuating mechanism. Thus, if one or several of the plows encounter an object which cannot be dislodged, it is contemplated that the bolts will shear and thus drop a plow or plows rather than transmit the resistance of the obstacle to more remote mechanism.

In the modified forms of rotor driving means illustrated somewhat diagrammatically in Figures 5 and 6, different forms of drives are indicated. As shown in Figure 5, a driving shaft 180 is mounted in bearings 181 and 182 on the implement frame and carries a worm 183 which engages the teeth of pinions 184 and 185, said pinion in turn engaging teeth on rotors 186 and 187, respectively, said rotors being journaled in suitable bearings carried by the implement frame.

In the modification shown in Figure 6, a shaft 190 is journaled in bearings 191 and 192 and carries at its free end a gear 193 meshing with another gear 194 secured to a shaft 195. This shaft is mounted in bearings 196 and 197 and carries bevel gears 198 and 199 which mesh with gear teeth on rotors 200 and 201, respectively.

Referring again to Figure 7, it will be noted that each of the plows has a share 202 of which the toe occupies the lowest position while the heel of the share is somewhat elevated to allow for clearance when the plow is in the forward position of its motion of rotation.

From the foregoing description and statement of mode of operation, it will be clear that my improved tilling machine provides an effective and economically operated device. The flexibility of movement is sufficient to meet all ordinary field conditions and the variety of speeds both of the tractor and of the plow rotors makes it possible to break up the soil to any required degree of fineness since this result is dependent in some measure upon the size of the "cut" which the plows are taking at any given time.

The concentric arrangement of the rotor driving shaft of the tractor with respect to the eccentrically controlled pivotal connection of this implement carrier affords not only an effective construction so far as raising and lowering of the implement carrier is concerned, but also provides effective means for adjusting the length of the rotor driving chain.

The plows are secured to the rotors in such a way that the machine is protected against injury from obstructions encountered in the ground.

Another feature of value in tilling operations is that by reason of the individual two speed control of the propelling members, it is possible to drive one crawler member at slower speed than the other to adjust the machine more accurately to the course.

I claim as my invention:

1. In a tilling machine the combination of a tractor, an implement carrying frame pivotally attached thereto, plow carrying rotors on said frame, means on the tractor for propelling the same, means for actuating the rotors including a rotor driving shaft on the tractor and having a sprocket, said shaft being substantially concentric with the pivotal attachment of the implement frame, a rotor driving shaft on said frame and having a sprocket, a chain connecting said sprockets, and eccentric means for varying the distance between the rotor driving shafts to take up slack in the chain.

2. In a tilling machine, an implement carrying frame having means for pivotal attachment to a tractor, and including bearings to support a pair of implement carrying rotors mounted for rotation at opposite sides of the frame, a housing interposed between said bearings to receive driving gear for the rotors, a side plate at each side of the frame, diagonally disposed braces between said side plates and a transversely extending compression member secured to said side plates and braces.

3. In a tilling machine, the combination of an implement carrier, means for moving the same, rotors on the carrier, each including an implement supporting frame having a depending flange and arms projecting therefrom, implements mounted on said rotors and having their standards secured to the flange and their mold boards secured to said arms, and means for actuating said rotors to drive the implements.

4. In a tilling machine, the combination of an implement carrier, means for moving the same, rotors on the carrier, each including an implement supporting frame having a depending flange and arms projecting therefrom, implements mounted on said rotors and having their standards secured to the flange and straddling the same, and their mold boards secured to said arms, and means for actuating the rotors to drive the implements.

5. A rotor for a tilling machine comprising an implement supporting frame having a depending circular flange and arms projecting therefrom, a plurality of implements mounted on said rotor and having their standards secured to the flange and their mold boards secured to said arms.

6. A rotor for a tilling machine comprising an implement supporting frame having a depending circular flange and arms projecting therefrom, a plurality of implements mounted on said rotor and having their standards secured to the flange and straddling the same, and their mold boards secured to said arms.

7. In a tilling machine the combination of a tractor, an implement carrying frame pivotally attached thereto, plow carrying rotors on said frame, means on the tractor for propelling the same, means for actuating the rotors including a rotor driving shaft on the tractor and having a sprocket, said shaft being substantially concentric with the pivotal attachment of the implement frame, a rotor driving shaft on said frame and having a sprocket, a chain connecting said sprockets, and means for varying the distance between the rotor driving shafts to take up slack in the chain.

In testimony whereof, I have signed my name to this specification this 10th day of February, 1922.

NORMAN C. STOREY.